United States Patent [19]

Suga

[11] 3,996,494

[45] Dec. 7, 1976

[54] LIGHT INTENSITY MONITORING AND ADJUSTING APPARATUS FOR XENON LAMP TYPE LIGHT FASTNESS TESTER

[76] Inventor: Shigeru Suga, Yoyogi 5-20-2, Shibuya, Tokyo, Japan

[22] Filed: Dec. 29, 1975

[21] Appl. No.: 645,297

[30] Foreign Application Priority Data

May 1, 1975 Japan ............................ 50-58384

[52] U.S. Cl. ............................ 315/151; 250/205; 250/226; 250/227; 315/158

[51] Int. Cl.² ........................................ G05D 25/02

[58] Field of Search .......... 315/149, 151, 155, 158; 250/205, 226, 227, 327, 492 R

[56] References Cited

UNITED STATES PATENTS

| | | | |
|---|---|---|---|
| 3,360,650 | 12/1967 | Lawrence | 315/151 X |
| 3,805,065 | 4/1974 | Williams | 250/227 X |
| 3,909,609 | 9/1975 | Kidd et al. | 250/226 |

*Primary Examiner*—Eugene La Roche
*Attorney, Agent, or Firm*—Wenderoth, Lind & Ponack

[57] ABSTRACT

A light intensity monitoring and adjusting apparatus for a light-fastness testing apparatus having a xenon lamp and a power source circuit for supplying power to the lamp. The monitoring and adjusting device has an optical fiber light guide having three bundles of optical fibers therein. One end is directed toward the xenon lamp for picking up the light emitted therefrom and the other end is connected to a light-receiving means including a plurality of three light-receiving elements, one for ultraviolet light, one for visible light, and one for infrared light. Each produces an electrical signal corresponding to the intensity of the light received. The apparatus has a source of reference voltage and a voltage comparator coupled to the source of reference voltage for comparing input voltages from the light-receiving elements with the reference voltage. A voltage adjusting means is coupled to the power source circuit for adjusting the voltage supplied to the lamp and is driven by the output of the voltage comparator to change the voltage supplied to the lamp to bring the intensity of the light produced by the lamp to a value corresponding to the light intensity value represented by the reference voltage, whereby the intensity of light in a spectrum emitted by the lamp can be kept constant for testing specimens for light-fastness under constant conditions.

7 Claims, 6 Drawing Figures

LIGHT INTENSITY MONITORING AND ADJUSTING APPARATUS FOR XENON LAMP TYPE LIGHT FASTNESS TESTER

This invention relates to a device for recording light energy from a xenon lamp used in a light-fastness testing apparatus and adjusting the xenon lamp in response to the light intensity to prevent the intensity from decreasing with the passage of time, so that tests can be with a constant amount of light.

BACKGROUND OF THE INVENTION AND PRIOR ART

Xenon lamps, which are used in light-fastness testing apparatus, in general have a lifetime of several hundred hours, the light emitted being strong when the lamp is new, but the intensity decreasing gradually with the passage of time. The intensity of the light, however, does not decrease uniformly over the whole of the spectrum of radiation emitted by the lamp, i.e., in the ultraviolet region (wavelengths of 300 to 400 nm), visible light region (400 to 700 nm) and infrared region (700 to 1200 nm). Therefore, in conducting light-fastness tests, the results obtained using a new lamp are often not in agreement with the results obtained using an old lamp even for the same samples.

OBJECTS AND BRIEF SUMMARY OF THE INVENTION

It is an object of the present invention to provide a light intensity monitoring and adjusting apparatus which can provide light of a constant intensity at least in one part of the spectrum of light emitted by a xenon lamp in a light-fastness testing device over the course of the useful life of the xenon lamp.

It is a further object to provide such an apparatus which will also record data on the intensity of light being emitted in other parts of the spectrum of light so that the intensities of light to which the specimens have been subjected will be known.

These objects are achieved by a light intensity monitoring and adjusting apparatus according to the invention which is for a light-fastness testing apparatus having a xenon lamp and a power source circuit for supplying power to said lamp, said monitoring and adjusting device comprising a light guide having a plurality of bundles of optical fibers therein and having one end directed toward the xenon lamp for picking up the light emitted therefrom, a light-receiving means to which the other ends of said bundle of optical fibers is connected and including a plurality of light-receiving elements corresponding in number to the number of bundles of optical fibers and each being for receiving light of a spectrum different from the spectrum of light received by the other light-receiving elements and producing and electrical signal corresponding to the intensity of the light in said spectrum, a source of reference voltage, a voltage comparator coupled to said source of reference voltage for comparing input voltages with said reference voltage switching means coupled between said light-receiving elements and said voltage comparator for switching the output of said light-receiving elements one at a time to said voltage comparator, and a voltage adjusting means coupled to said power source circuit for adjusting the voltage supplied to said lamp and coupled to said voltage comparator for being driven by the output thereof to change the voltage supplied to said lamp to bring the intensity of the light produced by said lamp in said spectrum to a value corresponding to the light intensity value represented by said reference voltage, whereby the intensity of light in a spectrum emitted by the lamp can be kept constant for testing specimens for light-fastness under constant conditions.

The apparatus can further comprise a recording means coupled to said switching means for recording the electrical signal information on the intensity of light from the light receiving elements other than the one coupled to said voltage comparator.

BRIEF DESCRIPTION OF THE FIGURES

The present invention will now be described in greater detail in connection with the accompanying drawings, in which.

DETAILED DESCRIPTION OF THE INVENTION

Figure 1:
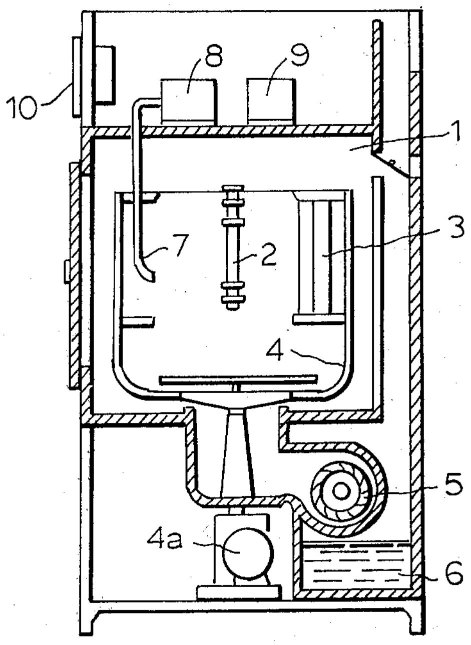
FIG. 1 is a diagrammatic sectional view illustrating the light-fastness testing apparatus according to the invention.

FIG. 1 shows the internal structure of the light-fastness testing apparatus, in which a xenon lamp 2 is provided in the center of a testing chamber 1, a sample 3 is mounted on a rotary frame 4 driven for rotation around the lamp 2 by motor 4*a* so as to be irradiated for testing as to light-fastness. Reference numeral 5 designates a blower, for blowing through the chamber 1, and numeral 6 designates a liquid vessel to hold liquid such as water, for control of the humidity in the testing chamber. The construction as described thus far is the same as for a conventional apparatus.

The apparatus further has a light intensity monitoring and adjusting means comprised of a light guide 7 made of optical fiber, a light-receiving section 8, an adjusting section 9, and a recording instrument 10.

Figure 3:
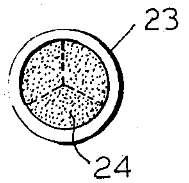
FIGS. 3 and 4 are transverse and longitudinal cross-sectional views, respectively, of an optical fiber used in the apparatus.
Figure 4:
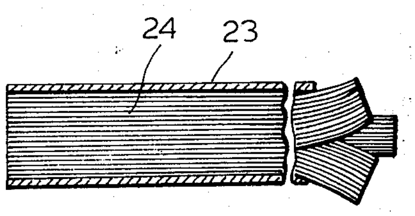

FIGS. 3 and 4 show the light guide 7 as being a flexible tube 23 containing a bundle of optical fibers 23 which is tri-sected and at one end is directed toward the lamp 2 and at the other end is connected to the light-receiving section 8.

Figure 2:
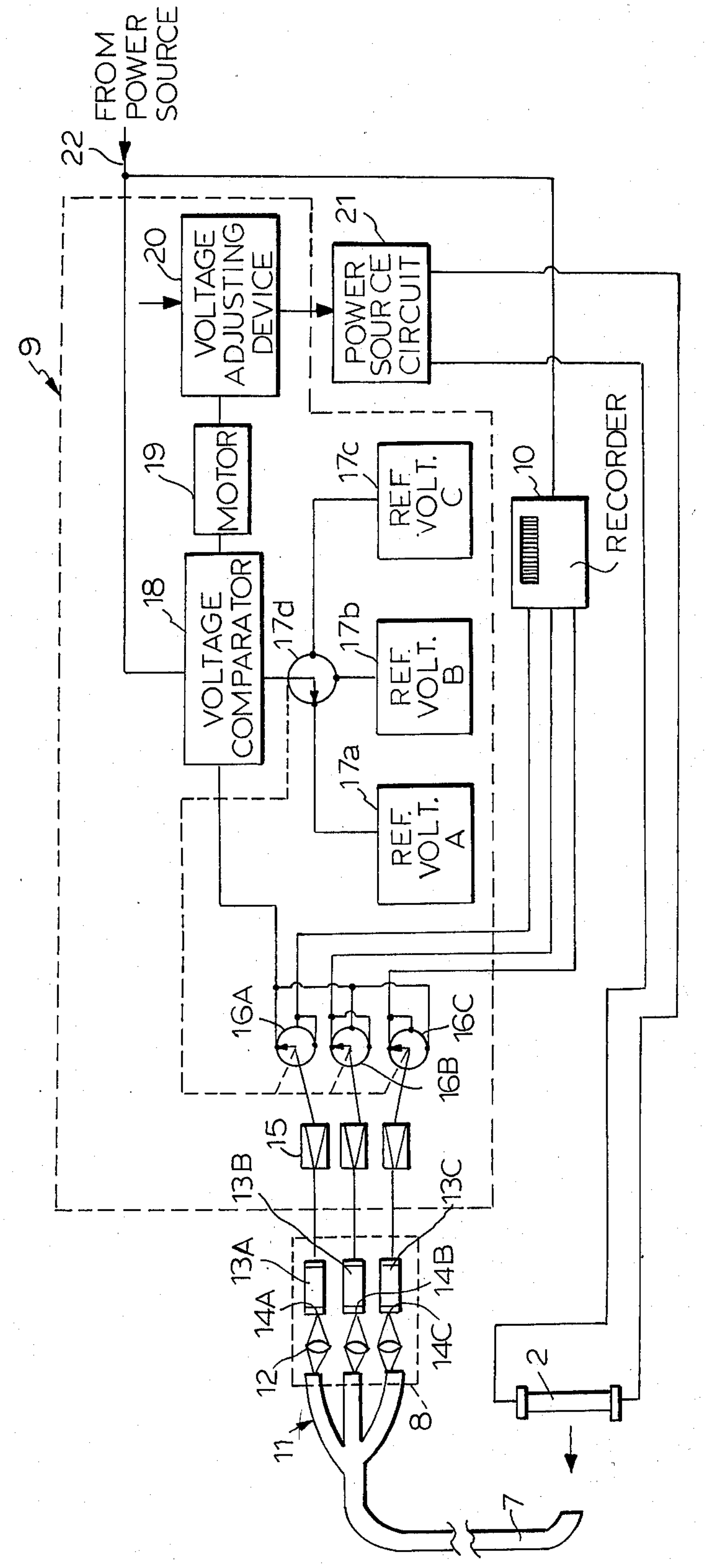
FIG. 2 is a schematic diagram showing the light intensity monitoring and control system of the apparatus.

As seen in FIGS. 2 and 4, the other end of the bundle of optical fibers 24 in the light guide 7 is separated into three parts as indicated at 11, and is connected to the light-receiving section 8. In the light-receiving section 8 is a lens 12 for each part of the bundle of fibers 24 which directs the light to respective light-receiving elements 13A–13C, such as photoelectric tubes, through respective filters 14A–14C. The filters 14A–14C filter out all but ultraviolet, visible and infrared light, respectively. The outputs of the light-receiving elements 13A–13C are coupled to amplifiers 15, the outputs of which are coupled to three-way switches 16A–16C. Two fixed contacts on each switch are connected to the recording instrument 10, and the third contact is connected to a voltage comparator 18, while the movable contact arms on the switches are coupled together so that they move simultaneously when the switches are switched. Mutually different fixed contacts on the respective switches are coupled to the voltage comparator 18, that is, the contact at the 0° position on swtich 16A is connected to the comparator 18, while the contact at the 90° position on switch 16B is connected to the comparator, and the contact at the 180° position on switch 16C is coupled to the comparator. Therefore, at any position of the movable contacts of the switches, only one fixed contact from among the three contacts on the respective switches will be coupled to the comparator, and the other two fixed contacts on the other two switches will be connected to the recording instrument 10.

A reference voltage source means having sources 17A, 17B and 17C supplies reference voltages to voltage comparator 18 for each of the three types of light, i.e. ultraviolet, visible and infrared, under the control of switch 17*d*, which is mechanically coupled to switches 16A–16C. Comparator 18 compares the voltage from the light-receiving section 8 with the appropriate reference voltage and produces an output according to any difference detected. Voltage comparator 18 includes an amplifier for amplifying the output of the comparator, the output of the amplifier actuating a balancing motor 19, which in turn is connected to a conventional voltage adjusting device 20 for adjusting it. Voltage adjusting device 20 is connected to a power source circuit 21 for energizing the xenon lamp, which in turn is supplied from a power source 22 for the entire apparatus.

Figure 5:
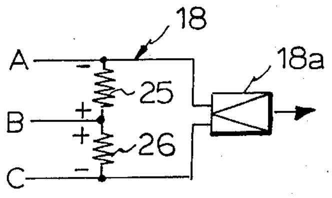
FIG. 5 is a circuit diagram showing a comparator circuit which compares the reference voltage needed for adjusting energy with the output voltage from the light-receiving section.

FIG. 5 is a diagram showing one circuit for the voltage comparator 18 which compares the reference voltage from one of the sources 17A–17C with the voltage from the light receiving elements 13A–13C. Referring to FIG. 5, the amplified voltage from the light receiving elements is connected across terminals A and B as supplied from the respective switch 16 in FIG. 2, and the voltage from the reference voltage source 17A–17C is connected across terminals B and C. The voltage across terminals A and C from the resistors 25 and 26 with the polarities as shown in amplified by amplifier 18*a* and supplied to the balancing motor 19. If the two voltages are equal, the motor remains at rest, and if there is a difference between the two voltages, the motor starts to run in a direction depending on the polarity of the voltage.

The operation of the apparatus of the present invention is as follows. The lamp 2 is lighted, and the output from the part of the light-receiving section 8 and the corresponding amplifier 15 to be maintained and adjusted is selected by properly setting switches 16A–16C and switch 17*d*. With switches 16A–16C and 17*d* in the positions shown in FIG. 2, the output from the light receiving element 13A is monitored and used to effect adjustment, and the outputs of light receiving elements 13B and 13C are recorded. The output from the light-receiving element 13A, after amplification in amplifier 15, is compared in circuit 18 with the reference voltage from source 17A. If the light intensity decreases, the difference in the resultant output voltage of element 13A from the reference voltage 17A is amplified, and the balancing motor 19 is actuated to adjust voltage adjusting device 20 to increase the supply voltage to the power-source circuit 21. Adjustment is effected so as to increase the discharge current of the lamp and the intensity of the light energy emitted, and continues until the amplified output voltage from the light-receiving element 13A is equal to the reference voltage. The intensity of the light emitted from the lamp in the spectrum passed by filter 14A is thus at all times maintained at a constant value. By adjusting the references voltage, the intensity of the light from the lamp can be varied correspondingly, making it possible to obtain light with an intensity suited for particular tests.

A majority of the results of tests made on plastics and dyestuffs using the apparatus of the present invention showed that better results are obtained when the energy is controlled so as to keep the light intensity constant in the ultraviolet region. In a few cases, some dyestuffs were degraded in regions near the visible light region, indicating that it is better to control the energy in the visible light region for such dyestuffs. In other words, testing samples that undergo degradation under irradiation by ultraviolet rays, the voltage corresponding to the ultraviolet light intensity should be compared with the reference voltage to maintain the voltage to the lamp at a value such that the energy emitted from the lamp is continuously corrected to keep the intensity of light in the ultraviolet region constant with the passage of time, while the intensity values in the visible and infrared regions are recorded. In testing samples that undergo degradation under irradiation by visible or infrared rays but not ultraviolet rays, the switches 16 should be changed to appropriate positions control the intensity in the visible light or infrared ray regions, while recording intensitites of light in other regions such as the ultraviolet region.

Thus, it is possible to select wavelength regions, depending upon the samples to be tested, in which irradiation can be carried out at a constant intensity level. If the data from the recording instrument is integrated, it is also possible to determine the total energy which the sample has received and the degree of xenon lamp degradation which indicates when the lamp should be replaced.

Figure 6:
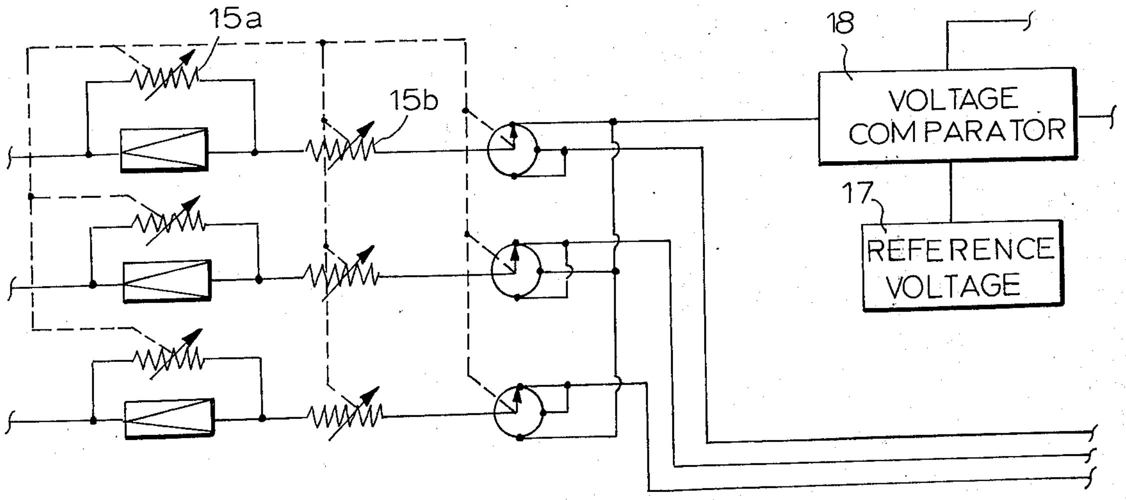
FIG. 6 is a partial circuit diagram of an alternative part of the adjusting section of the system of FIG. 2.

An alternate arrangement for the adjusting section 9 is shown in FIG. 6, which permits use of only a single reference voltage source 17. Amplifiers 15 each have a variable resistor 15a connected thereacross for adjusting the gain of the amplifier, and a variable resistor 15*b* connected in series therewith to adjust the output of the amplifier. The variable resistors are connected with the switches 16A–16C to be adjusted to adjust the output of the amplifiers to a voltage on the same order of that of the reference voltage, so that a single reference voltage can be used.

What is claimed is:

1. A light intensity monitoring and adjusting apparatus for a light-fastness testing apparatus having a xenon lamp and a power source circuit for supplying power to said lamp, said monitoring and adjusting device comprising a light guide having a plurality of bundles of optical fibers therein and having one end directed toward the xenon lamp for picking up the light emitted therefrom, a light-receiving means to which the other ends of said bundle of optical fibers is connected and including a plurality of light-receiving elements corresponding in number to the number of bundles of optical fibers, and each being for receiving light of a spectrum different from the spectrum of light receiving by the other light-receiving elements and producing an electrical signal corresponding to the intensity of the light in said spectrum, a reference voltage source means, a voltage comparator coupled to said source means for comparing input voltages with reference voltage, switching means coupled between said light-receiving elements and said voltage comparator for switching the output of said light-receiving elements one at a time to said voltage comparator, and a voltage adjusting means coupled to said power source circuit for adjusting the voltage supplied to said lamp and coupled to said voltage comparator for being driven by the output thereof to change the voltage supplied to said lamp to bring the intensity of the light produced by said lamp in said spectrum to a value corresponding to the light intensity value represented by said reference voltage, whereby the intensity of light in a spectrum emitted by the lamp can be kept constant for testing specimens for light-fastness under constant conditions.

2. An apparatus as claimed in claim 1 in which said voltage adjusting means comprises a voltage adjusting device and a motor coupled thereto for driving said voltage adjusting device, the output of said comparator being coupled to said motor for operating said motor.

3. An apparatus as claimed in claim 1 in which there are three bundles of optical fibers and three light-receiving elements and said light-receiving elements are for receiving ultraviolet, visible and infrared light spectra respectively.

4. An apparatus as claimed in claim 1 in which said light-receiving means further comprises a lens for each light-receiving element for directing the light from the corresponding bundle of optical fibers to said light-receiving element, and an amplifier coupled to the output of each of said light-receiving elements.

5. An apparatus as claimed in claim 1 further comprising a recording means coupled to said switching means for receiving from said light-receiving means and recording electrical signal information on the intensity of the light from the light-receiving elements other than the light-receiving element coupled to said voltage comparator.

6. An apparatus as claimed in claim 1 in which said reference voltage source means comprises a plurality of reference voltage sources, one for each of the different spectrums of light, and a switch coupled between said voltage comparator and said reference voltage sources and mechanically coupled with said switching means for supplying a reference voltage to the comparator corresponding to the spectrum of light being supplied to the light receiving element connected to the voltage comparator.

7. An apparatus as claimed in claim 1 in which said reference voltage source means comprises a single reference voltage source, and said apparatus further includes means coupled to each light-receiving element for adjusting the output thereof to a voltage on the order of the voltage of the reference voltage from the reference voltage source.

* * * * *